(12) United States Patent
Zhang et al.

(10) Patent No.: US 12,523,726 B2
(45) Date of Patent: Jan. 13, 2026

(54) JOINT K-SPACE AND IMAGE-SPACE RECONSTRUCTION IMAGING METHOD AND DEVICE

(71) Applicant: ZHEJIANG UNIVERSITY, Zhejiang (CN)

(72) Inventors: Yi Zhang, Hangzhou (CN); Tao Zu, Hangzhou (CN); Dan Wu, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 288 days.

(21) Appl. No.: 18/482,883

(22) Filed: Oct. 8, 2023

(65) Prior Publication Data

US 2024/0036141 A1 Feb. 1, 2024

Related U.S. Application Data

(63) Continuation of application No. PCT/CN2021/140280, filed on Dec. 22, 2021.

(30) Foreign Application Priority Data

Apr. 8, 2021 (CN) .......................... 202110379060.9

(51) Int. Cl.
   *G01R 33/561* (2006.01)
   *G01R 33/56* (2006.01)
(52) U.S. Cl.
   CPC ...... *G01R 33/5611* (2013.01); *G01R 33/5608* (2013.01)
(58) Field of Classification Search
   None
   See application file for complete search history.

(56) References Cited

U.S. PATENT DOCUMENTS

| 2006/0208731 A1 | 9/2006 | Wang et al. |
| 2008/0129289 A1 | 6/2008 | Stemmer et al. |

(Continued)

FOREIGN PATENT DOCUMENTS

| CN | 103384836 A | 11/2013 |
| CN | 104635188 A | 5/2015 |

(Continued)

OTHER PUBLICATIONS

Japanese Office Action for Application No. 2023-558119, mailed Jul. 26, 2024 (13 pages).

(Continued)

*Primary Examiner* — Lennin R Rodriguezgonzalez
(74) *Attorney, Agent, or Firm* — Wiersch Law Group

(57) ABSTRACT

A joint k-space and image-space reconstruction imaging method and a device, relating to the field of magnetic resonance imaging. The method comprises: first, using the k-space parallel imaging method to reconstruct under-sampled image frames having auto-calibration signals of a subject obtained from multi-frame imaging required for the measurement of magnetic resonance parameters; and then performing reconstruction in image space for other under-sampled image frame data without auto-calibration signals. In the method, an accurate sensitivity map required for the SENSE method is generated from under-sampled data, without the need of additional acquisition. By means of the present method, images that are almost identical to those obtained by the traditional GRAPPA method and without obvious artifacts can be obtained at a speed which is four times faster than that by the traditional GRAPPA method. The present method is especially suitable for accelerating three-dimensional (3D) multi-frame magnetic resonance imaging.

10 Claims, 5 Drawing Sheets

(56) References Cited

U.S. PATENT DOCUMENTS

| | | |
|---|---|---|
| 2008/0197844 A1 | 8/2008 | Ying et al. |
| 2009/0001984 A1 | 1/2009 | Hwang |
| 2010/0237864 A1 | 9/2010 | Stemmer |
| 2012/0299590 A1 | 11/2012 | Riederer |
| 2013/0099786 A1 | 4/2013 | Huang et al. |
| 2014/0376794 A1 | 12/2014 | Dumoulin et al. |
| 2018/0081015 A1 | 3/2018 | Gebhardt et al. |
| 2018/0189930 A1 | 7/2018 | Dannels |
| 2020/0249300 A1 | 8/2020 | Sandino et al. |
| 2020/0319283 A1 | 10/2020 | Wang |

FOREIGN PATENT DOCUMENTS

| | | |
|---|---|---|
| CN | 106491131 A | 3/2017 |
| CN | 109839607 A | 6/2019 |
| CN | 111513716 A | 8/2020 |
| CN | 113009398 A | 6/2021 |
| DE | 102009014461 A1 | 9/2010 |
| JP | 2005525183 A | 8/2005 |
| JP | 2006130285 A | 5/2006 |
| JP | 2011200637 A | 10/2011 |
| JP | 2013240589 A | 12/2013 |
| JP | 2014503292 A | 2/2014 |
| JP | 2018075075 A | 5/2018 |

OTHER PUBLICATIONS

International Search Report (PCT/CN2021/140280); Date of Mailing: Mar. 24, 2022.

First Office Action(CN202110379060.9); Date of Mailing: Oct. 26, 2021.

Autocalibrated-coil-sensitivity-estimation-for-parallel-imaging.

ESPIRIT—An-Eigenvalue-Approach-to-Autocalibrating-Parallel-MRI: Where-SENSE-Meets-GRAPPA.

Partially-Parallel, susceptibility-weighted-MR-imaging-of-brain-vasculature-at-7-Tesla-using-sensitivity-encoding-and-an-autocalibrating-parallel-technique.

JOINT K-SPACE AND IMAGE-SPACE RECONSTRUCTION IMAGING METHOD AND DEVICE

CROSS-REFERENCE TO RELATED APPLICATIONS

The present application is a continuation of International Application No. PCT/CN2021/140280, filed on Dec. 22, 2021, which claims priority to Chinese Application No. 202110379060.9, filed on Apr. 8, 2021, the contents of both of which are incorporated herein by reference in their entireties.

TECHNICAL FIELD

The present disclosure belongs to the field of magnetic resonance imaging, and can realize rapid acquisition for magnetic resonance parameter measurement requiring multi-frame image data.

BACKGROUND

Magnetic resonance imaging (MRI) can be used to measure tissue parameters including nuclear spin density, longitudinal relaxation time (T1), transverse relaxation time (T2), apparent diffusion coefficient (ADC), cerebral blood flow rate and magnetization transfer rate. The signal source of these parameters can be the nucleus of endogenous compounds existing in organisms (such as $^1H$ in water), or exogenous substances or tracers. The direct quantification of MRI parameters of tissues can provide more valuable clinical information about various pathologies in nerve, musculoskeletal, liver and myocardial imaging.

Imaging techniques for measuring these parameters include relaxation time imaging, diffusion imaging, perfusion imaging, functional magnetic resonance imaging (fMRI) and chemical exchange saturation transfer (CEST) imaging. Most of the imaging techniques need to acquire multi-frame image data sets with pulse sequence parameter modulation for the same imaging object. These modulated pulse sequence parameters include echo time (TE), flip angle or gradient intensity, etc. For example, diffusion imaging needs to acquire data under different gradient magnetic fields for the same imaging object. The estimation of target parameters can be realized by fitting the signal evolution in multi-frame image data set with a mathematical model. Due to the requirement for multiple acquisition, the scanning time is very long, which limits its clinical application; on the other hand, extra motion may be easily be introduced in a longer scanning time, which makes the technology itself more sensitive to motion. Therefore, reducing the data acquisition time and accelerating the imaging process are not only convenient for patients, but also conducive to improving image quality.

In order to speed up the parameter measurement in multi-frame imaging, domestic and foreign scholars have proposed many methods. Taking CEST technology as an example, there are methods such as Keyhole-CEST, SLAM, k-w ROSA, and CS-CEST. The Keyhole-CEST method combines the acquired low-resolution image with the high-resolution reference image to reduce the data to be acquired each time, but it sacrifices the high-frequency information of the image. The SLAM method directly generates regional CEST measurement values from regions of interest with arbitrary shapes using the prior positioning knowledge obtained from reconnaissance scanning, which has much higher signal-to-noise ratio efficiency than traditional single voxel and multi-voxel methods, but the information of organizational heterogeneity within the region is lost. Based on the model method, the k-w ROSA method can estimate the asymmetric Z spectrum of interest directly from the complete or incomplete measurement by decomposing and merging the Z spectrum signal based on subspace into the measurement model, but its acceleration ability is limited. The CS-CEST method based on compressive sensing takes advantage of the sparsity of images in transform domain to speed up, but complete random undersampling has not yet been implemented in practical applications.

The parallel imaging method is widely used in clinic because of its practicability and robustness. At present, it can be roughly divided into two categories: a self-calibration k space method represented by GRAPPA, and an image space method based on explicit coil sensitivity represented by SENSE. GRAPPA is a self-calibration k space parallel imaging algorithm, which fits missing points by linear combination of multi-channel data. The calibration equation of GRAPPA is as follows:

$$y = Aw \quad [1]$$

where A represents a source data matrix generated by an automatic calibration signal (ACS), y represents a target data vector, and w represents the weight to be fitted. Previous studies show that when the acceleration factor is low, GRAPPA can produce accurate images with high robustness. For parameter measurement that requires multi-frame data, because many frames of images need to be collected, the traditional GRAPPA method needs to collect ACSs for each image frame, which greatly reduces the speed-up effect. If only one ACS is collected, the weights calculated from it will be applied to all undersampled frames, and unknown artifacts will be introduced. On the other hand, when the acceleration factor is high, GRAPPA can only collect data from the k space far away to fit the missing data, which increases the error. The principle of GRAPPA limits its speed-up ability. In practice, two times speed-up is generally used for two-dimensional (2D) imaging and 2×2 times speed-up is generally used for three-dimensional (3D) imaging.

SENSE regards parallel reconstruction as the inverse problem of linear equation in an image space. When a sensitivity map is completely accurate, SENSE can produce the optimal solution in the sense of least squares. However, in practice, it is difficult to obtain an accurate sensitivity map, and small errors in the sensitivity map can lead to strong convolution artifacts in the reconstructed image. Recently, a variable acceleration sensitivity coding (vSENSE) method has been proposed to accelerate multi-frame image data acquisition and parameter measurement. In multi-frame imaging, since the images of different frames are obtained from the same imaging object, they have the same coil sensitivity in theory. Based on this assumption, the vSENSE method obtains an adjusted sensitivity map from a fully sampled or undersampled image frame with a lower multiple, and then reconstructs other image frames undersampled with a higher acceleration factor. Although vSENSE has high acceleration ability, it has three obvious shortcomings. First, it is not a self-calibration method, and obtaining the initial sensitivity map from additional reference scans may introduce inconsistency; second, in the latest 3D vSENSE method, because the full-sampled image is not available, the SENSE image frame with twice acceleration is regarded as accurate, and the reconstructed image still has potential artifacts; third, the highest acceleration factor in 3D vSENSE method is 8, and there are many artifacts, thus its speed-up effect is still limited.

Therefore, in the field of MR parameter measurement that requires multi-frame imaging, it is of great significance to propose a method that can self-calibrate reconstruction, allow higher acceleration factor and have high robustness.

SUMMARY

The object of the present disclosure is to solve the problems in the prior art that multi-frame imaging reconstruction cannot be self-calibrated, and the reconstructed image has potential artifacts, and the speed-up effect is greatly limited, and to provide fast imaging method device of joint k-space and image-space parallel imaging, (hereinafter referred to as a KIPI method), which can recover accurate images from highly undersampled k-space data.

The specific technical solution adopted by the present disclosure is as follows:

In a first aspect, the present disclosure provides a joint k-space and image-space reconstruction imaging method, which is used for reconstructing undersampled image frames;

the undersampled images frame includes a first undersampled image frame with automatic calibration signals and a second undersampled image frame without automatic calibration signals and with an acceleration factor of not less than 2, and where an acceleration factor of the first undersampled image frame is not higher than that of the second undersampled image frame;

the reconstruction method includes the following steps:

step S1, reconstructing a complete image frame as a calibration frame for the first undersampled image frame by using a self-calibration parallel imaging method in a k space; performing Fourier transform on k-space data of the calibration frame to obtain a coil image of each channel, and merging the coil images of all channels to obtain a channel merged image;

step S2, dividing the coil image of each channel by the channel merged image to obtain a sensitivity map of a coil of each channel; identifying a support region from the channel merged image, smoothing and denoising the support region in the sensitivity map, and extrapolating an unsupported region in the sensitivity map to obtain an optimized sensitivity map;

step S3, using the optimized sensitivity map to perform a SENSE reconstruction with an acceleration factor of 1 on the calibration frame to generate a reference image; at the same time, performing etrospective undersampling for the calibration frame, an acceleration factor of the retrospective undersampling being the same as that of the second undersampled image frame, and then performing a SENSE reconstruction for undersampled data to generate a retrospective reconstructed image with a potential aliasing artifact; obtaining a correction factor graph based on the reference image and the retrospective reconstructed image, and a pixel value of each position in the correction factor graph being a quotient of the pixel values of the corresponding positions in the reference image and the retrospective reconstructed image; and step S4, for the remaining second undersampled image frames other than the first undersampled image frame, using the optimized sensitivity map to perform a SENSE reconstruction, and multiplying an image after the SENSE reconstruction with the correction factor graph to obtain a complete image frame with a suppressed artifact.

As a preference of the first aspect, in the step S1, the self-calibration parallel imaging method in the k space is a GRAPPA method, and the complete image frame is reconstructed by calculating a coil weight and applying the same to an undersampled region.

Further, the GRAPPA method is GRAPPA with Tikhonov regularization.

As a preference of the first aspect, the first undersampled image frame and the second undersampled image frame are both two-dimensional images; the acceleration factor of the first undersampled image frame is preferably 2, and the acceleration factor of the second undersampled image frame is preferably 2 to 4.

As a preference of the first aspect, the first undersampled image frame and the second undersampled image frame are both three-dimensional images; the acceleration factor of the first undersampled image frame is preferably 2×2, and the acceleration factor of the second undersampled image frame is preferably N×M, and where 2≤N≤4, 2≤M≤4, and a total acceleration factor does not exceed 12.

As a preference of the first aspect, in the step S1, all coil images are merged by a square root method or an adaptive method.

As a preference of the first aspect, in the step S2, the support region in the sensitivity map is smoothed and denoised by fitting.

As a preference of the first aspect, in the step S3, the correction factor graph needs to be filtered by a filter to remove an abnormal value.

As a preference of the first aspect, in the step S4, a truncated singular value regularization method is adopted during the SENSE reconstruction using the optimized sensitivity map.

In a second aspect, the present disclosure provides a magnetic resonance imaging apparatus, including a magnetic resonance scanner and a control unit, where a computer program is stored in the control unit, and when executed, the computer program is configured for implementing the imaging method according to any solution according to the first aspect; the magnetic resonance scanner is configured for acquiring data of the first undersampled image frame and the second undersampled image frame.

Compared with the prior art, the present disclosure has the following beneficial effects:

The present disclosure does not need ACS data of all frames, thus greatly improving the net acceleration effect. The present disclosure can use the undersampled image frames with an acceleration factor greater than or equal to 2 to generate an accurate sensitivity map. Because the first undersampled image frame is first reconstructed by a self-calibration parallel imaging method (such as GRAPPA) in a k space, there is no need for additional sensitivity maps, and this method can realize self-calibration. The present disclosure combines the robustness of the self-calibration parallel imaging method in the k space, and can further accelerate the acquisition speed compared with the original vSENSE method.

This method is especially suitable for 3D multi-frame imaging because it does not need to use all sampled image frames. Moreover, when obtaining the source image needed for parameter measurement, the present disclosure allows the forward-looking acceleration factor in the direction of phase coding and layer selection coding to be increased to 12 times of the original, and generates the source image and the final target parameter image consistent with the true value result. On the other hand, according to the present disclosure, the image reconstructed from the highly undersampled data has no obvious aliasing artifacts.

DESCRIPTION OF EMBODIMENTS

The present disclosure will be further elaborated and explained with the attached drawings and specific embodiments. The technical features of each embodiment of the present disclosure can be combined accordingly without conflicting with each other.

For the SENSE reconstruction method, if the $i(1 \leq i \leq N)^{th}$ coil image is known, then the sensitivity map $SE_i$ of the $i^{th}$ coil can be obtained by dividing $m_i$ by the coil combination image $\rho$.

$$SE_i = m_i/\rho \quad [2]$$

Therefore, for retrospective SENSE reconstruction with an acceleration factor (AF) of 2 (without loss of generality), there is the following equation:

$$s_{N*1} = m_{N*1}^1 + m_{N*1}^2 = \rho^1 SE_{N*1}^1 + \rho^2 SE_{N*1}^2 = \begin{bmatrix} SE_{N*1}^1 & SE_{N*2}^2 \end{bmatrix} \begin{bmatrix} \rho^1 \\ \rho^2 \end{bmatrix} \quad [3]$$

where $s_{N*1}$ represents the folded channel image vector, and superscripts 1 and 2 represent two different spatial aliasing positions. $m_{N*1}^1$ and $m_{N*1}^2$ represent image vectors of two spatial aliasing positions, respectively. $\rho^1$ and $\rho^2$ respectively represent pixel values of two spatial aliasing positions in the coil combination image. $SE_{N*1}^1$ and $SE_{N*1}^2$ respectively represent coil sensitivity vectors of two spatial aliasing positions.

The least square solution of equation [3] is as follows:

$$\begin{bmatrix} \hat{\rho}^1 \\ \hat{\rho}^2 \end{bmatrix} = (SEE^H SEE)^{-1} SEE^H s_{N*1} = \underbrace{(SEE^H SEE)^{-1} SEE^H SEE}_{I} \begin{bmatrix} \rho^1 \\ \rho^2 \end{bmatrix} = \begin{bmatrix} \rho^1 \\ \rho^2 \end{bmatrix} \quad [4]$$

where $SEE = [SE_{N*1}^1 \; SE_{N*1}^2]$, I is an identity matrix. $\hat{\rho}^1$ and $\hat{\rho}^2$ represent estimates of $\rho^1$ and $\rho^2$, respectively.

In practice, the channel image is usually unknown. It is noted that if the result of GRAPPA reconstruction is taken as $m_1$ for substitution, and equation [2-4] actually illustrates that applying the sensitivity map derived from the reconstruction result of GRAPPA to SENSE can produce the same result as that of GRAPPA reconstruction, regardless of the acceleration factor of SENSE. In fact, equations [3] and [4] are valid as long as the sensitivity used conforms to the definition of equation [2], whether it is completely accurate or not. Because different image frames in multi-frame imaging technology have the same sensitivity, the sensitivity map derived from GRAPPA reconstruction frame can be applied to other frames.

Figure 8:
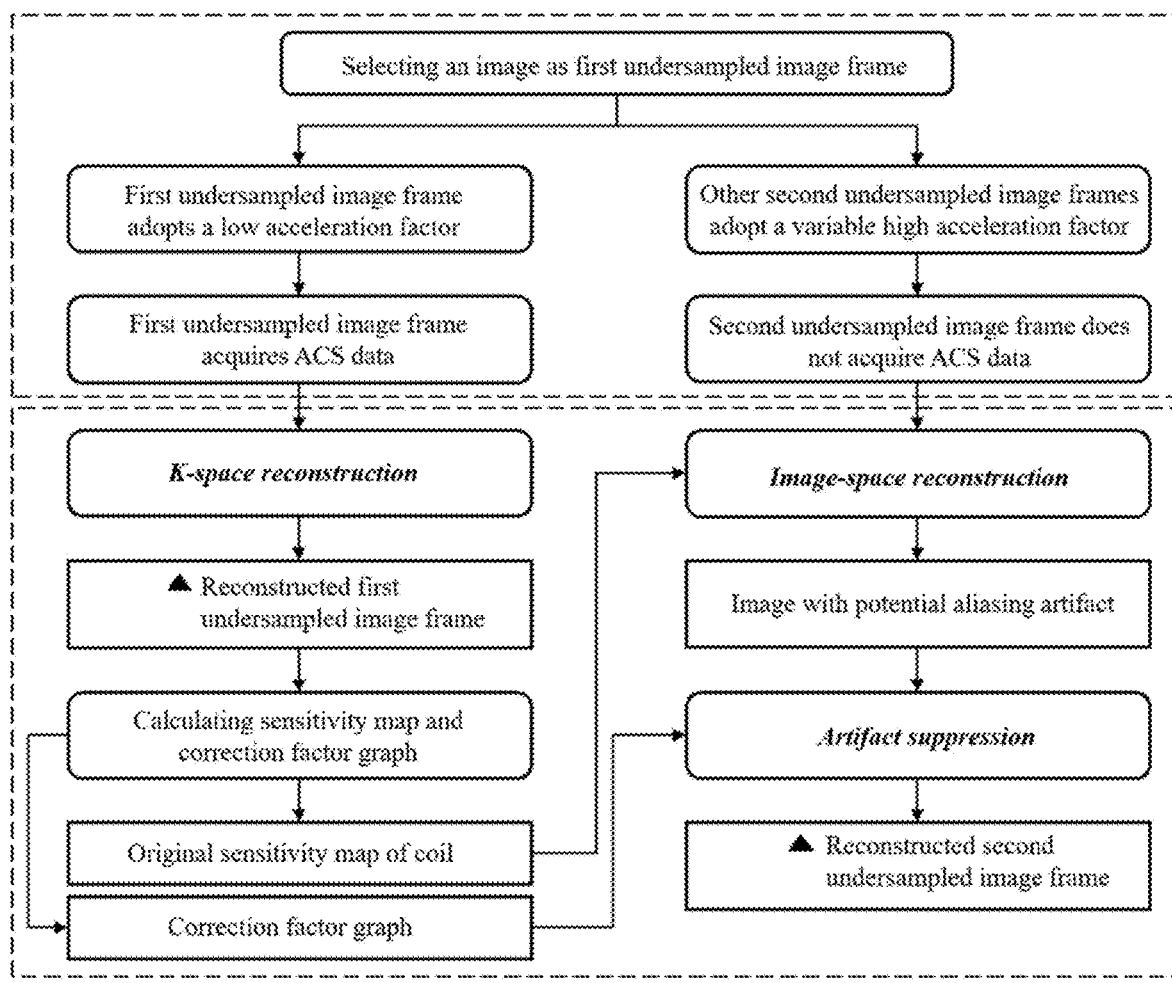
FIG. 8 is a schematic flow chart of the KIPI method of the present disclosure, in which the first undersampled image frame after reconstruction is the calibration frame.

Based on the above principle, when sampling, the present disclosure selects an image frame in multi-frame imaging to be undersampled with a lower acceleration factor (for example, AF=2 for 2D imaging and AF=2×2 for 3D imaging) and reserves the automatic calibration signal (ACS) in the central part, which is recorded as the first undersampled image frame; other frames are undersampled with a higher acceleration factor, and there is no ACS, which is recorded as the second undersampled image frame. According to the present disclosure, a first undersampled image frame with a lower acceleration factor is GRAPPA reconstructed as a calibration frame, and then a corresponding sensitivity map is calculated by equation [2], and then the second undersampled image frame is SENSE reconstructed by using this sensitivity map. In general, the accuracy of SENSE reconstruction is only related to the sensitivity map used, and has nothing to do with the specific image contrast. The above derivation has proved that the application of SENSE reconstruction in calibration frame can obtain the same image quality as that of GRAPPA with low acceleration factor. However, because the calibration frame and other second undersampled image frames have the same sensitivity (ideal accuracy, but unavailable) and the imaging objects are the same, images with similar quality to the calibration frame can also be obtained by using the derived sensitivity map (actual, but available) for SENSE reconstruction in other frames. The flow chart of the joint k-space and image-space reconstruction imaging method provided by the present disclosure is shown in FIG. 8, and the specific implementation process is described below.

The multi-frame imaging reconstruction method is mainly used for reconstructing the undersampled image frames obtained by a magnetic resonance scanner, where the undersampled image frames should include a first undersampled image frame with ACSs and a second undersampled image frame without ACSs. The acceleration factor AF of the second undersampled image frame should not be lower than 2, and the acceleration factor of the first undersampled image frame should not be higher than that of the second undersampled image frame, so as to save the time required for acquiring the second undersampled image frame. The first undersampled image frame only needs one frame, while the second undersampled image frame has many frames. Therefore, if the calibration frame can be obtained by using the first undersampled image frame, and then the remaining second undersampled image frames can be reconstructed, the acquisition speed can be greatly improved.

It should be noted that the undersampled image frame obtained by the magnetic resonance scanner can be either a 2D image or a 3D image. The specific acceleration factor of the undersampled image frame needs to be adjusted according to the actual situation. If the undersampled image frame is a 2D image, the acceleration factor of the first undersampled image frame is preferably 2, and the acceleration factor of the second undersampled image frame is preferably 2 to 4. If the undersampled image frame is a 3D image, the acceleration factor of the first undersampled image frame is preferably 2×2, and the acceleration factor of the second undersampled image frame is preferably N×M, where $2 \leq N \leq 4$, $2 \leq M \leq 4$, and the total acceleration factor does not exceed 12.

The joint k-space and image-space reconstruction imaging method includes the following specific steps:

S1, for the first undersampled image frame, a complete image frame is reconstructed as a calibration frame by using the self-calibration parallel imaging method GRAPPA in the k space. then, the k-space data of the calibration frame is Fourier transformed to obtain the coil image of each channel, and the coil images of all channels are merged to obtain the channel merged image.

The GRAPPA method belongs to the prior art, which calculates the coil weights and applies them to the undersampled region to reconstruct a complete image frame. Further, if the GRAPPA method is adopted, the present disclosure recommends the adoption of GRAPPA with Tikhonov regularization.

However, it should be noted that in this step, although GRAPPA is recommended to realize the reconstruction of the first undersampled image frame, other k-space self-calibration parallel imaging methods such as SPIRiT and CAIPIRINHA can be adopted according to the situation.

In addition, in this step, all the coil images can be merged by the root-sum square (RSS) method, and of course, the adaptive combine method can also be adopted.

S2, the coil image of each channel is divided by the channel merged image to obtain the sensitivity map of the coil of each channel. The support region is identified from the channel merged image, and the support region in the sensitivity map is smoothed and denoised, and the unsupported region in the sensitivity map is extrapolated to obtain the optimized sensitivity map.

In this step, the support region in the sensitivity map can be smoothed and denoised by fitting. Fitting includes two ways: local fitting and global fitting. Of course, it can also smooth and denoise the supporting region in the form of filter filtering.

S3, the optimized sensitivity map is used to perform SENSE reconstruction with an acceleration factor of 1 on the calibration frame to generate a reference image. At the same time, the calibration frame is retrospectively undersampled, and the acceleration factor of retrospective undersampling is the same as that of the second undersampled image frame, and then the undersampled data is reconstructed by SENSE to generate a retrospective reconstructed image with potential aliasing artifacts. Then a correction factor graph is obtained based on the reference image and the retrospective reconstructed image, and the pixel value of each position in the correction factor graph is the quotient of the pixel values of the corresponding positions in the reference image and the retrospective reconstructed image, that is, the reference image and the retrospective reconstructed image are quotient pixel by pixel to obtain the correction factor graph.

It should be noted that there may be abnormal values in the directly obtained correction factor graph, so it is best to filter the correction factor graph c with a filter and remove the abnormal values before proceeding to the next step.

S4, for every second undersampled image frame except the first undersampled image frame, the SENSE reconstruction can be performed by using the optimized sensitivity map, and the image reconstructed by SENSE can be multiplied by the correction factor graph to obtain a complete image frame with a suppressed artifact.

It should be noted that in this step, when multiplying the image reconstructed by SENSE with the correction factor graph, the multiplication of the two images refers to the point-by-point multiplication of the pixel values in the same positions in the two images as the pixel values in the corresponding position in the complete image frame.

It should be noted that the second undersampled image frame in the present disclosure has multiple frames, but different second undersampled image frames may have different acceleration factors. When the second undersampled image frame of each frame is reconstructed by SENSE, the correction factor graph adopted by it also needs to be obtained based on the same acceleration factor. Specifically, if the acceleration factor of a second undersampled image frame is X, the calibration frame needs to be retrospectively undersampled based on the acceleration factor X in S3, and then the retrospective reconstructed image is reconstructed by SENSE, and the correction factor graph is obtained based on the reference image and the retrospective reconstructed image. When the acceleration factor of the second undersampled image frame of another frame is Y, the calibration frame needs to be retrospectively undersampled based on the acceleration factor Y in S3, and then the retrospective reconstructed image is reconstructed by SENSE, and the correction factor graph is obtained based on the reference image and the retrospective reconstructed image.

In this step, when the optimized sensitivity map is used for SENSE reconstruction, a truncated singular value regularization method is preferred, and some smaller singular values are discarded.

Thus, S1 to S4 above constitute a joint k-space and image-space reconstruction imaging method (KIPI) of the present disclosure. In practical application, the KIPI method mentioned above can be integrated into the control unit of magnetic resonance imaging equipment, thus forming a magnetic resonance imaging equipment that can automatically perform multi-frame imaging reconstruction. The magnetic resonance imaging apparatus includes a magnetic resonance scanner and a control unit, where a computer program is stored in the control unit, and when the computer program is executed, the KIPI method can be implemented. However, the undersampled image data (the first undersampled image frame and the second undersampled image frame) required by the KIPI method are obtained by the magnetic resonance scanner in advance.

The above-mentioned magnetic resonance scanner can be realized by using the existing technology, which belongs to mature commercial products and will not be described in detail.

The control unit may be a general processor, including a Central Processing Unit (CPU) and a Network Processor (NP; it can also be a Digital Signal Processing (DSP), an application specific integrated circuit (ASIC), a Field-Programmable Gate Array (FPGA) or other programmable logic apparatuses, discrete gate or transistor logic apparatuses, and discrete hardware components.

It should be noted that the control unit should have the necessary imaging sequences and other software programs to realize multi-frame imaging in addition to the programs to realize the KIPI method.

The joint k-space and image-space reconstruction imaging method and apparatus of the present disclosure can be applied to any multi-frame imaging technology in magnetic resonance imaging, including but not limited to relaxation time (T1, T2) imaging, diffusion imaging, perfusion imaging, functional imaging (fMRI), magnetic resonance spectroscopy (MRS) imaging and chemical exchange saturation transfer (CEST) imaging.

Based on CEST imaging, the technical effects that can be achieved by the aforementioned KIPI method of the present disclosure will be further demonstrated through an embodiment, so that those skilled in the art can better understand the essence of the present disclosure.

EXAMPLES

1. MRI Experiment

All phantom experiments and human experiments were carried out on a 3 Tesla (T) Siemens scanner (Magnetom Prisma, Siemens Healthcare, Erlangen, Germany), using 64-channel receiver coils. The phantom consisted of a flask filled with 2% agarose gel and two test tubes. One tube was filled with 10% bovine serum albumin (BSA), which was dissolved in phosphate buffered saline (PBS), and the other tube was filled with 5% BSA, which was also dissolved in PBS. Human research has been approved by the Review Committee of local institutions.

The sequence used was a CEST imaging sequence, and the measured MRI parameter was the amplitude of amide proton transfer effect.

For the phantom, a saturated pulse with a duration of 1.0 s and 2μ T was used for CEST scanning, and then a fat-suppressed axial 2D multi-spin echo (TSE) sequence was sued to read out, and the acquisition parameters were TE=6.7 ms; TR=3 s; FA=90; FOV=212×186 $mm^2$; resolution=2.2×2.2 $mm^2$; thickness=5 mm; acquisition matrix size=96×96; turbine coefficient=42. A total of 51 frames with different frequency offsets were collected, including unsaturated frame S0 and saturated frame with 6 to −6 ppm, in which the step size was 0.5 ppm. The Number of Signal Average (NSA) of each saturated frame was 2. The 2D human study used the same parameters as the phantom study.

For the 3D human brain experiment, a SPACE-CEST sequence was used to collect data, and the running parameters were as follows: TE=17 ms, TR=3 s, FOV=212×212× 201 mm$^3$, resolution=2.8×2.8×2.8 mm$^3$, acquisition matrix size=76×76×72, turbine coefficient=140, NSA=1.2, GRAPPA acceleration factor=2×1 (in the direction of phase coding and layer selection coding, respectively). ACS adopts embedded acquisition, and its matrix size is 24×76×72. Seven CEST saturated offset frames were collected in total for amide proton transfer weighted (APTw) imaging, including (S0), ±3, ±3.5, and ±4-ppm.

For B0 correction, a GRE sequence with the same field of view, orientation and resolution as the CEST sequence was used in 2D and 3D experiments, and TR was 30 ms. The GRE sequence run in a double echo mode, with TE of 4.92 ms and 9.84 ms, respectively.

2. Image Reconstruction and Analysis

All the processing and analysis were done off-line by using MATLAB (MathWorks, Natick, MA) software written on a PC (3.2 GHz).

In the 2D experiment, the first +3.5 ppm was selected as the first undersampled image frame, with AF=2. The second undersampled image frame was as follows: S0 and ±3.5 ppm (excluding the first undersampled image frame) undersampled AF=2, and the other 46 frames AF=4. For the 3D experiment, +3.5 ppm frame was selected as the first undersampled image frame, with AF=2×2, and the remaining 6 frames as the second undersampled image frame with AF=2×4 (the first 3D experiment) or AF=4×3 (the second 3D experiment); for the first undersampled image frame, the size of the ACS matrix was reduced from 24×76×72 to 24×76×24, which meant that only a part of the original ACS was retained. Note that only the first undersampled image frame retained ACS data in both 2D and 3D experiments.

KIPI of this embodiment is divided into the following steps:

1. First, the first undersampled image frame was reconstructed using GRAPPA. The first undersampled image frame was reconstructed by GRAPPA with Tikhonov regularization, and ACS data was filled in as calibration frame. The reconstructed k-space data of the calibration frame was Fourier transformed to obtain the coil images of each channel, and then the coil images of all channels were reconstructed and merged by root-sum square (RSS), and the merged image of the channels was recorded as a RSS image. The 2D GRAPPA kernel was 4×5, which represented four collected phase coding lines and five frequency coding points. That is to say, a missing point would be fitted with 20 points in each channel. In the same sense, the 3D GRAPPA kernel was 4×5×4 (phase coding×frequency coding× layer selection coding direction respectively).

2. Second, the sensitivity map of the coil was calculated. By dividing the coil image of each channel by the above RSS image, the original sensitivity distribution map of each channel was calculated from the reconstructed calibration frame image. The sensitivity map calculated in this way was the same as the geometric parameters of the image scanned by the machine, therefore registration is not needed. Therefore, threshold processing was used to identify the support region from the RSS image (the threshold was set near 0.1), and morphological imaging method was used to fill the holes in the sensitivity map and smooth the boundary of the region. In this embodiment, a locally weighted polynomial regression (LWPR) fitting with a cubic weighted kernel was used to smooth and denoise the supported regions in the sensitivity map, and the unsupported regions in the sensitivity map were extrapolated to obtain an optimized sensitivity map. The polynomial used in this embodiment was a second-order polynomial, and the window width of the supported region was 12, and the window width of the unsupported region was 24.

3. Third, a correction factor graph for artifact suppression was calculated. The optimized sensitivity map was used to perform the SENSE reconstruction with an acceleration factor of 1 on the reconstructed calibration frame image to generate a reference image $\rho_0$. Then, retrospective undersampling was performed in the calibration frame, and the acceleration factor of retrospective undersampling was the same as that of the second undersampling image frame that needed to be reconstructed later. Then, SENSE reconstruction was performed on the undersampled data to generate a retrospective reconstructed image $\rho_1$ with potential aliasing artifacts. The correction factor graph was defined as the point-by-point division of the aliased image by the retrospective reconstructed image, that is, the pixel value of each position in the correction factor graph was the quotient of the pixel values of the corresponding positions in the reference image and the retrospective reconstructed image. In addition, the correction factor graph in this embodiment needed to be filtered by a median filter with a window of 3×3 to remove abnormal values. The calculation formula of correction factor graph C can be expressed as follows:

$$C=\rho_1{'}/\rho_1$$

4. Finally, all the remaining second undersampled image frames were reconstructed. In this step, a truncated singular value regularization method was used to perform SENSE reconstruction on the second undersampled image frame, and the singular values smaller than the maximum value of 2% were discarded. Then, by using the artifact suppression method, the image generated by the SENSE method was multiplied by the correction factor graph point by point to further reduce the error, and the complete image frame with artifact suppression could be obtained.

It should be noted that in this embodiment, the second undersampled image frame of 2D experiment had two acceleration factors, namely AF=2 and AF=4, therefore it was also necessary to carry out retrospective undersampling based on AF=2 and AF=4 respectively in the third step to generate two different correction factor graphs, and the corresponding correction factor graphs corresponded to the SENSE reconstruction of the second undersampled image frame in the fourth step.

For comparison, the retrospectively undersampled data are reconstructed by GRAPPA with variable acceleration. In this case, the GRAPPA weight obtained from the ACS of the first undersampled image frame was applied to all other frames. By comparing the normalized root mean square error (RNMSE) of GRAPPA and KIPI with the true values, the accuracy of KIPI method was evaluated. When comparing 2D images, the fully sampled image were taken as the true value; for 3D images, because the full sampling time was too long, the conventional 2×1 GRAPPA image was regarded as the true value.

The APTw parameter image was calculated as follows. First, the source image is registered to the first undersampled frame 3.5 ppm. Secondly, the phase difference of GRE images obtained by two different TE was calculated as a B0 map. Thirdly, according to the calculated B0 map, the corrected +3.5-ppm and −3.5-ppm signal values were generated for each voxel. Finally, the corrected 3.5-ppm and +3.5-ppm images were subtracted to obtain the APTw parameter image.

3. Analysis of Results

Figure 1:
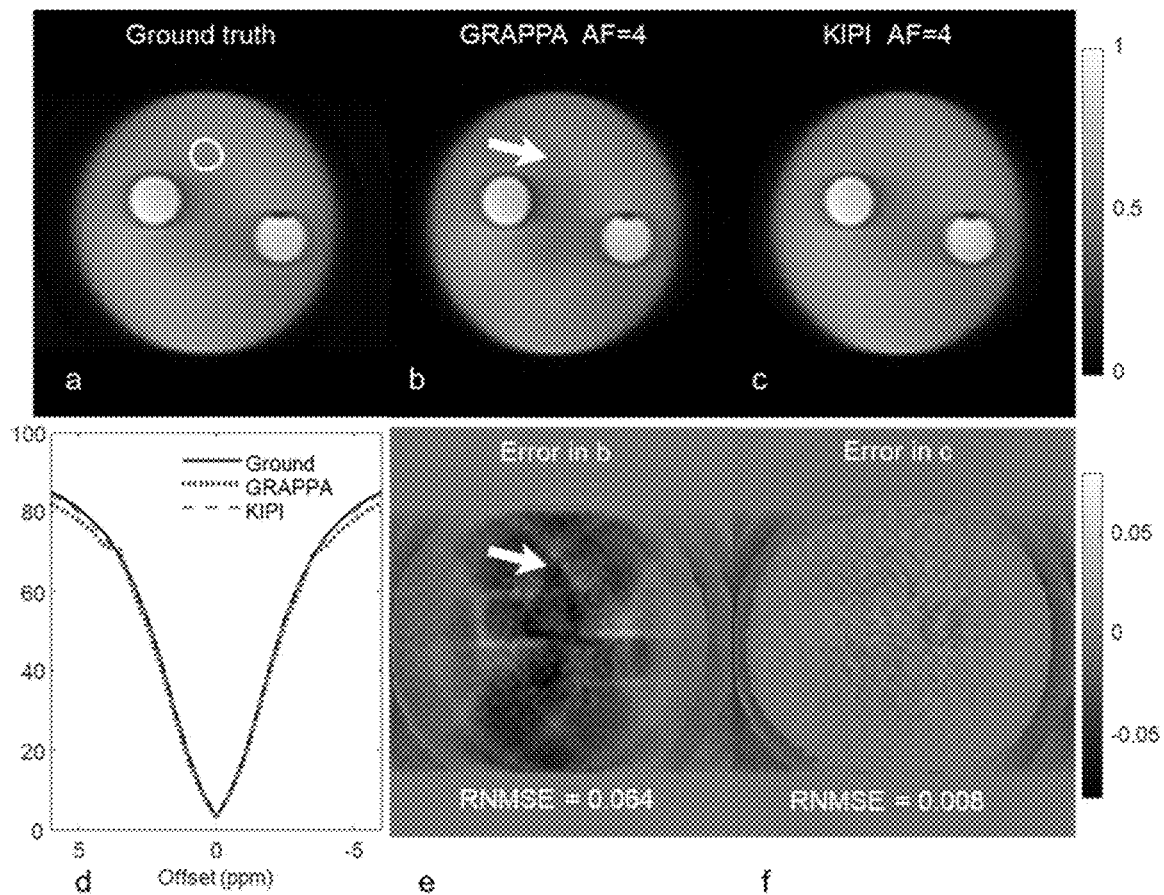
FIG. 1 shows resulting reconstructed diagrams according to an embodiment; comparison of reconstructing +6 ppm phantom images with GRAPPA and KIPI. Where a is the result of the root-sum square (RSS) reconstruction of the fully sampled k space; b is the phantom source image reconstructed by GRAPPA when the acceleration factor (AF)=4; c is the phantom source image reconstructed by KIPI when AF=4; d is the Z spectrum and full k-space result (solid line) obtained by GRAPPA (dotted line) and KIPI (double dashed line) in the region of interest of the selected a image; e and f are the difference diagrams between b image, c image and a image respectively. b and c images use the same undersampled data with variable acceleration factors, the first +3.5 ppm is selected as the first undersampled image frame with AF=2, S0 and 3.5 ppm (excluding the first undersampled image frame) are selected as AF=2, the other 46 frames with AF=4.

As can be seen from FIG. 1, the error of the GRAPPA method (FIG. 1b, e) is much larger than that of KIPI method (FIG. 1c, f) (arrow). KIPI generates high-quality images (with a reconstruction error RNMSE=0.008). In addition, in the case of undersampling with variable acceleration factors, the z spectrum of the circled place (dotted line in FIG. 1d) of the conventional GRAPPA has a great error compared with the ground truth (solid line in FIG. 1d). The result produced by KIPI (double-dashed line in FIG. 1d) is almost consistent with the ground truth.

Figure 2:
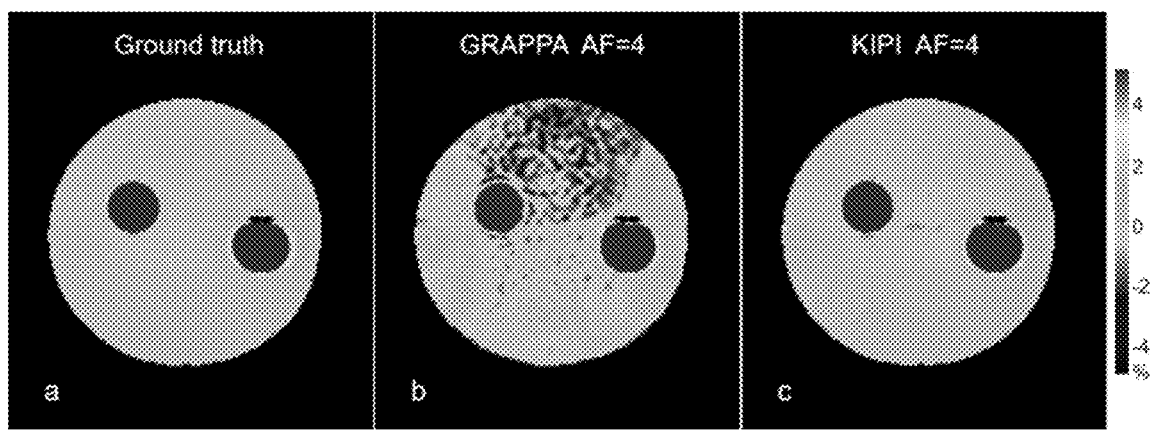
FIG. 2 shows amide proton transfer weighted (APTw) parameter images of the water model according to an embodiment. Where a is the APTw image calculated by full sampling data; b is an APTw image obtained by reconstructing other second undersampled image frames by GRAPPA using the weights obtained from ACS data of the first undersampled image frame, resulting in obvious artifacts; c is the APTw image obtained by reconstructing other second undersampled images by KIPI using the sensitivity map derived from the calibration frame. b and c use the same undersampled data with variable acceleration factors, the first +3.5 ppm is selected as the first undersampled image frame with AF=2, S0 and ±3.5 ppm (excluding the first undersampled image frame) are selected as AF=2, the other 46 frames with AF=4.

FIG. 2 shows APTw parameter images calculated from the source image (FIG. 1). The APTw image generated by KIPI method (FIG. 2c) is very consistent with the ground truth (fully sampled, FIG. 2a), showing only slight differences. However, when using GRAPPA with AF=4, a large area of low signals appears, with obvious aliasing characteristics of the phase coding direction. KIPI and GRAPPA use the same undersampled data with variable acceleration factors, the first +3.5 ppm is selected as the first undersampled image frame with AF=2, S0 and ±3.5 ppm (excluding the first undersampled frame) are selected as AF=2, the other 46 frames with AF=4.

Figure 3:
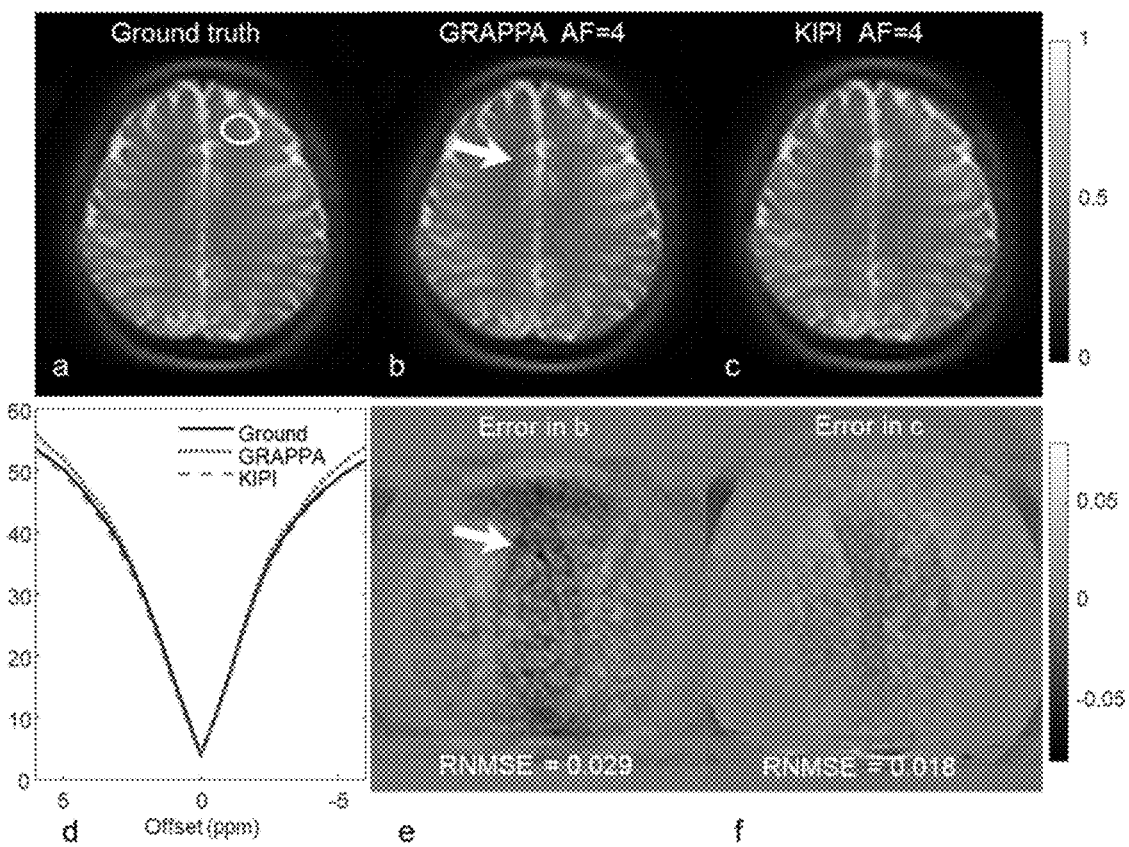
FIG. 3 shows +6 ppm brain images reconstructed by GRAPPA and KIPI according to an embodiment. Where a is RSS reconstruction of a fully sampled k space; b is the source image of a healthy volunteer reconstructed by GRAPPA when AF=4; c is the source image of a healthy volunteer reconstructed by KIPI when AF=4; d is the Z spectrum and full k-space result (solid line) obtained by GRAPPA (dotted line) and KIPI (double dashed line) in the region of interest of the selected a image; e and f are the difference diagrams between b, c and a images, respectively. b and c images use the same undersampled data with variable acceleration factors, the first +3.5 ppm is selected as the first undersampled image frame with AF=2, S0 and ±3.5 ppm (excluding the first undersampled image frame) are selected as AF=2, the other 46 frames with AF=4.

FIG. 3 shows images of a healthy human brain under the same experimental conditions. Similar to the phantom study, the results also verify that KIPI reconstruction is more accurate than GRAPPA. On the one hand, the consistency between the source image generated by KIPI (FIG. 3c) and the ground truth (FIG. 3a) is better than that of the source image reconstructed from the same data using GRAPPA (FIG. 3b; the reconstruction errors are 0.018 and 0.029 respectively). On the other hand, the z spectrum generated by KIPI method (FIG. 3d; double-dashed line) is almost indistinguishable from the total k-space spectrum (FIG. 3d; solid line), while GRAPPA leads to significant errors (FIG. 3d; dashed line).

Figure 4:
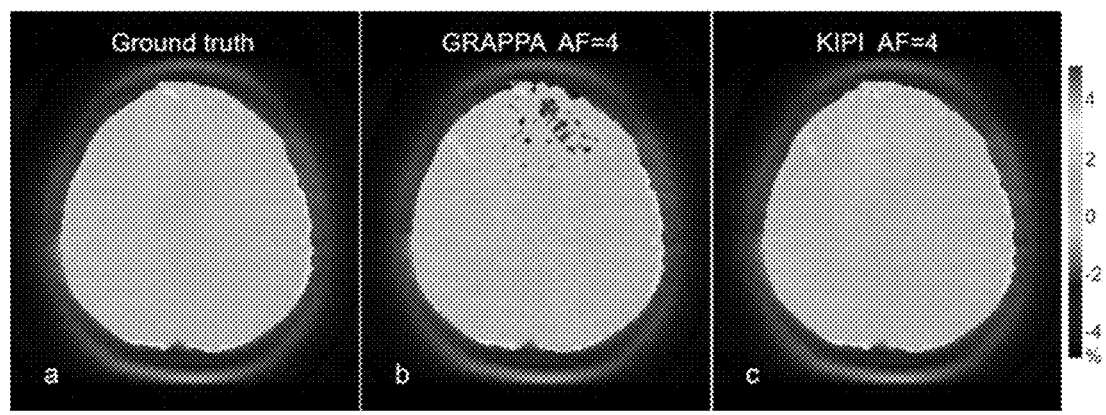
FIG. 4 shows 2D APTw parameter images of a healthy volunteer according to an embodiment. Where a is the APTw image calculated by full sampling data; b is an APTw image reconstructed by GRAPPA when AF=4, and the weights obtained from the ACS data of the calibration frame are used to reconstruct other frames; c is an APTw image reconstructed by KIPI when AF=4, and the sensitivity map derived from the calibration frame is used in the SENSE step. b and c images use the same undersampled data with variable acceleration factors, the first +3.5 ppm is selected as the first undersampled image frame with AF=2, S0 and ±3.5 ppm (excluding the first undersampled image frame) are selected as AF=2, the other 46 frames with AF=4.

FIG. 4 shows the APTw parameter images generated from the source image (FIG. 3). Due to the inaccuracy of the z spectrum, the result of GRAPPA (FIG. 4b) has obvious artifacts in the corresponding position circled by solid lines in FIG. 3(a). However, compared with the true value (FIG. 4a), the image quality of the KIPI method (FIG. 4c) almost has no loss. The lack of enhancement of APTw images seen here is a characteristic of a healthy subject. KIPI and GRAPPA use the same undersampled data with variable acceleration factors, the first +3.5 ppm is selected as the first undersampled image frame with AF=2, S0 and ±3.5 ppm (excluding the first undersampled image) are selected as AF=2, the other 46 frames with AF=4.

Figure 5:
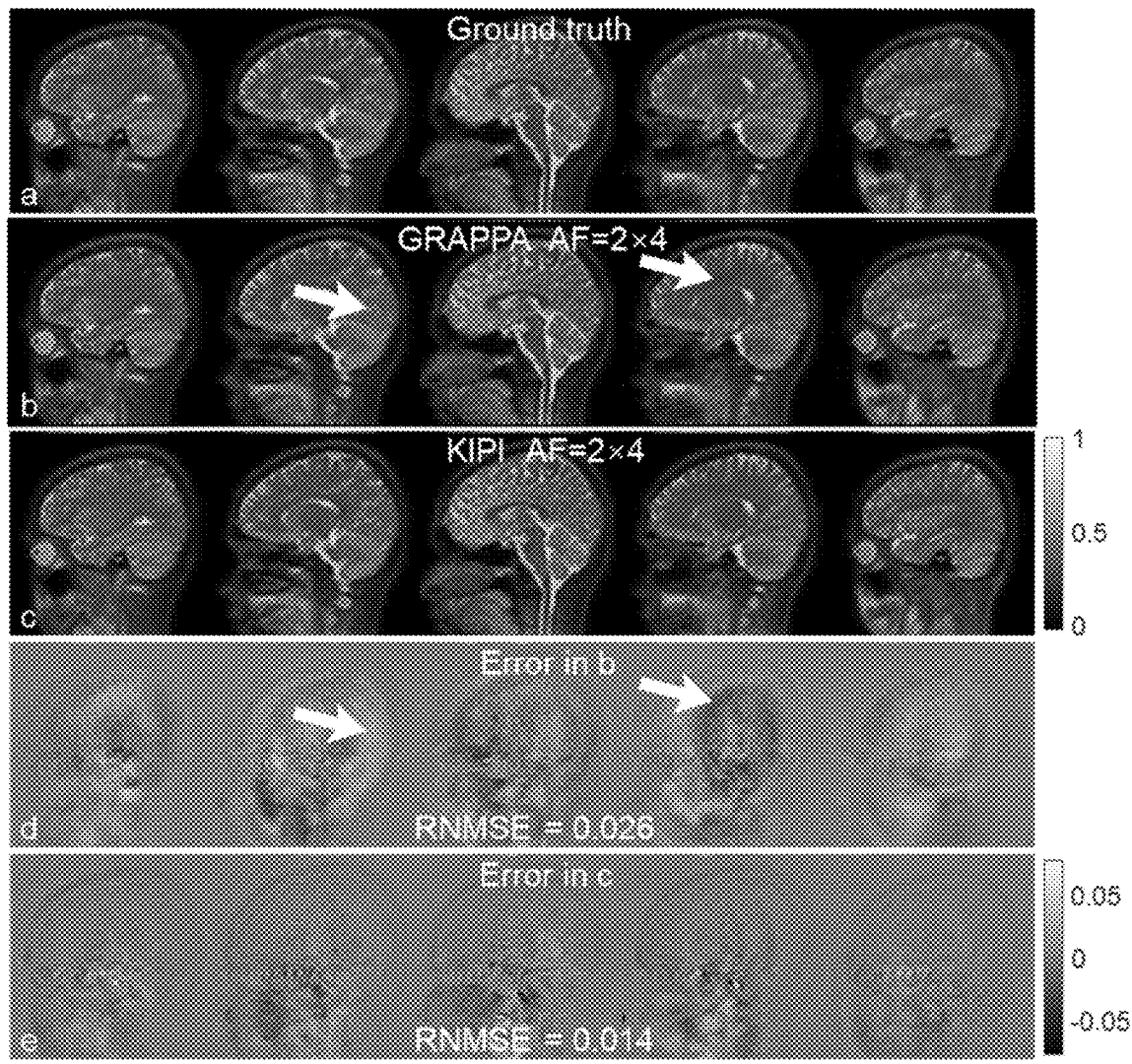
FIG. 5 shows −4 ppm 3D-CEST source images of a healthy volunteer according to an embodiment (5 images selected from 72 images in each group). Where a is the source image of −4 ppm obtained by traditional GRAPPA reconstruction with AF=2×1; b is the source image of a healthy volunteer reconstructed by GRAPPA on undersampled data with variable acceleration factors; c is the source image of a healthy volunteer reconstructed by KIPI on undersampled data with variable acceleration factors; d and e are the difference diagrams of the reconstruction results of GRAPPA and KIPI relative to the ground truth a, and the reconstruction errors (RNMSE) are 0.026 and 0.014, respectively. The arrow points to the aliasing artifacts reconstructed by GRAPPA. The undersampled data of a variable acceleration is, +3.5 ppm frame has ACS data, and AF=2×2 is the first undersampled image frame; the other six frames have no ACS data and AF=2×4 is the second undersampled image frame.

FIG. 5 shows the source images of −4 ppm obtained by using the conventional GRAPPA with AF=2×1 (phase coding and layer selection coding direction), and the results of the same undersampled data reconstructed by KIPI and conventional GRAPPA. Due to the limitation of scanning time, it is impossible to obtain a fully sampled 3D CEST acquisition, and the traditional 2×1 GRAPPA scan (FIG. 5a) is considered as an accurate true value. Although the same undersampled data with variable acceleration factors is used, the source image generated by KIPI (FIG. 5c) is more in line with the ground truth than that reconstructed by GRAPPA (FIG. 5b). In addition, aliasing artifacts are also obvious in GRAPPA images (FIGS. 5b, d; arrow).

Figure 6:
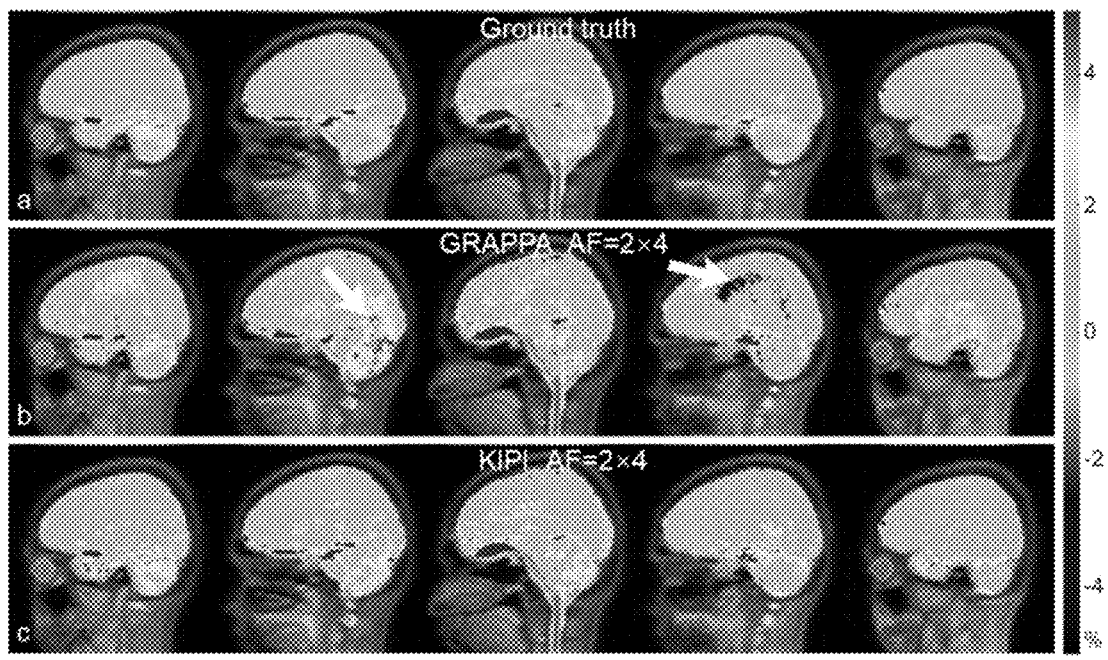
FIG. 6 shows APTw parameter images of a healthy volunteer according to an embodiment (each group has 5 images selected from 72 images). Where a is the APTw image obtained by GRAPPA reconstruction of AF=2×1 data and ACS data of all frames; b is the APTw image of a healthy volunteer reconstructed by GRAPPA on undersampled data with variable acceleration factors; c is the APTw image of a healthy volunteer reconstructed by KIPI on undersampled data with variable acceleration factors. Arrows indicate artifacts in GRAPPAPTW images with variable acceleration factors. Where +3.5 ppm frame has ACS data, and AF=2×2 is the first undersampled image frame; the other six frames have no ACS data and AF=2'4 is the second undersampled image frame.

FIG. 6 shows APTw parameter images generated by B0 correction and image registration of the source image from FIG. 5. A large number of artifacts can be seen in the APTw image (FIG. 6b) reconstructed by the conventional GRAPPA method, mainly showing aliasing artifacts in the layer selection direction. In contrast, the APTw image generated by KIPI method (FIG. 6c) has little difference from the ground truth (FIG. 6a). Undersampled data with variable acceleration factors: +3.5 ppm frame has ACS data, AF=2×2; the other 6 frames have no ACS data and AF=2×4.

Figure 7:
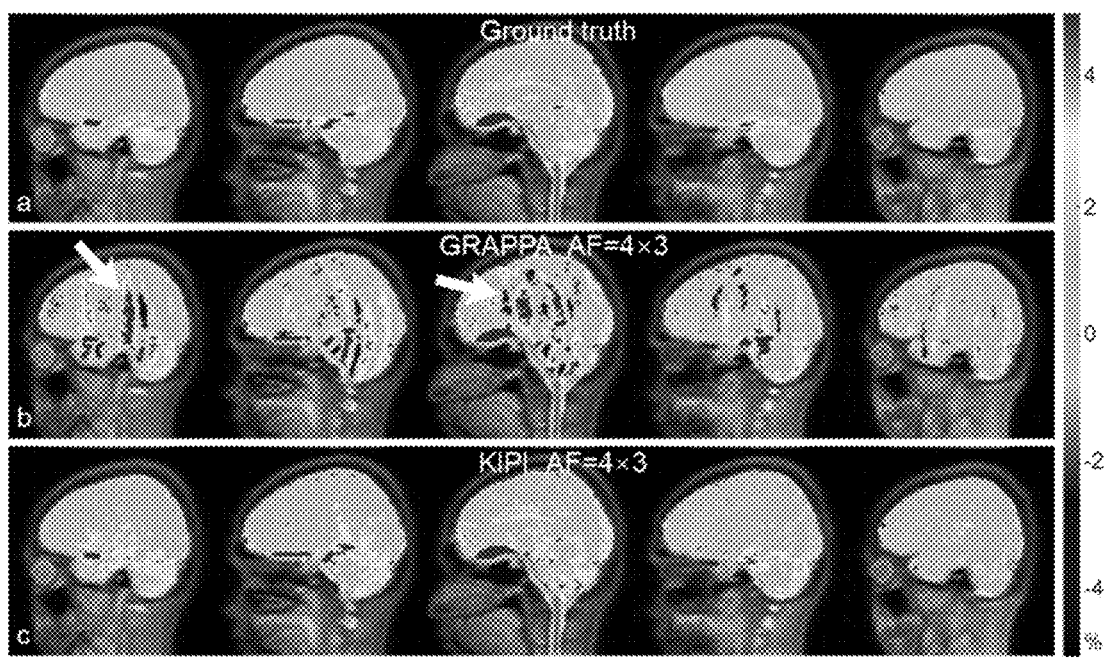
FIG. 7 shows APTw images of a healthy volunteer according to an embodiment (each group has 5 images selected from 72 images). Where a is the APTw image obtained by GRAPPA reconstruction of AF=2×1 data and ACS data of all frames; b is the APTw image of a healthy volunteer reconstructed by GRAPPA on undersampled data with variable acceleration factors; c is the APTw image of a healthy volunteer reconstructed by KIPI on undersampled data with variable acceleration factors. Arrows indicate artifacts in GRAPPAPTW images with variable acceleration factors. Where +3.5 ppm frame has ACS data, and AF=2×2 is the first undersampled image frame; the other six frames have no ACS data and AF=4×3 is the second undersampled image frame.

FIG. 7 shows APTw parameter images of a healthy volunteer with a higher acceleration factor. +3.5 ppm frame is selected as the first undersampled image frame, with AF=2×2, the other 6 frames with AF=4×3. Different from FIG. 6(b), the folding artifact of GRAPPA is mainly reflected in the phase coding direction. Similarly, there are obvious artifacts in APTw image reconstructed by GRAPPA, but there are almost no artifacts in the KIPI result. The KIPI single source image frame has an acceleration factor of 12. Overall, the net effective acceleration factor can reach 8.

The embodiment described above is only a better solution of the present disclosure, but it is not intended to limit the present disclosure. Those skilled in the relevant technical field can make various changes and modifications without departing from the spirit and scope of the present disclosure. Therefore, all technical solutions obtained by equivalent substitution or equivalent transformation fall within the protection scope of the present disclosure.

What is claimed is:

1. A joint k-space and image-space reconstruction imaging method for reconstructing undersampled image frames in multi-frame imaging, wherein the undersampled image frames comprise a first undersampled image frame with automatic calibration signals and a second undersampled image frame without automatic calibration signals and with an acceleration factor of not less than 2, and wherein an acceleration factor of the first undersampled image frame is not higher than an acceleration factor of the second undersampled image frame;

the reconstruction method comprises:

step S1 of reconstructing a complete image frame as a calibration frame for the first undersampled image frame by using a self-calibration parallel imaging method in a k space; performing Fourier transform on k-space data of the calibration frame to obtain a coil image of each channel, and merging the coil images of all channels to obtain a channel merged image;

step S2 of dividing the coil image of each channel by the channel merged image to obtain a sensitivity map of a coil of each channel; identifying a support region from the channel merged image, smoothing and denoising the support region in the sensitivity map, and extrapolating an unsupported region in the sensitivity map to obtain an optimized sensitivity map;

step S3 of using the optimized sensitivity map to perform a SENSE reconstruction with an acceleration factor of 1 on the calibration frame to generate a reference image; performing retrospective undersampling for the calibration frame, an acceleration factor of the retrospective undersampling being the same as the acceleration factor of the second undersampled image frame, and performing a SENSE reconstruction for undersampled data to generate a retrospective reconstructed image with a potential aliasing artifact; obtaining a correction factor graph based on the reference image and the retrospective reconstructed image, and a pixel value of each position in the correction factor graph being a quotient of the pixel values of the corresponding positions in the reference image and the retrospective reconstructed image; and step S4 of using the optimized sensitivity map to perform a SENSE reconstruction for the remaining second undersampled image frames other than the first undersampled image frame, and multiplying an image after the SENSE reconstruction with the correction factor graph to obtain a complete image frame with a suppressed artifact.

2. The joint k-space and image-space reconstruction imaging method according to claim 1, wherein in the step S1, the self-calibration parallel imaging method in the k space is a GRAPPA method, and the complete image frame is reconstructed by calculating a coil weight and applying the coil weight to an undersampled region.

3. The joint k-space and image-space reconstruction imaging method according to claim 2, wherein the GRAPPA method is GRAPPA with Tikhonov regularization.

4. The joint k-space and image-space reconstruction imaging method according to claim 1, wherein the first undersampled image frame and the second undersampled image frame are both two-dimensional images; the acceleration factor of the first undersampled image frame is preferably 2, and the acceleration factor of the second undersampled image frame is preferably 2 to 4.

5. The joint k-space and image-space reconstruction imaging method according to claim 1, wherein the first undersampled image frame and the second undersampled image frame are both three-dimensional images; the acceleration factor of the first undersampled image frame is preferably 2×2, and the acceleration factor of the second undersampled image frame is preferably N×M, and wherein $2 \leq N \leq 4$, $2 \leq M \leq 4$, and a total acceleration factor does not exceed 12.

6. The joint k-space and image-space reconstruction imaging method according to claim 1, wherein in the step S1, all coil images are merged by a square root method or an adaptive method.

7. The joint k-space and image-space reconstruction imaging method according to claim 1, wherein in the step S2, the support region in the sensitivity map is smoothed and denoised by fitting.

8. The joint k-space and image-space reconstruction imaging method according to claim 1, wherein in the step S3, the correction factor graph needs to be filtered by a filter to remove an abnormal value.

9. The joint k-space and image-space reconstruction imaging method according to claim 1, wherein in the step S4, a truncated singular value regularization method is adopted during the SENSE reconstruction using the optimized sensitivity map.

10. A magnetic resonance imaging apparatus, comprising a magnetic resonance scanner and a control unit, wherein a computer program is stored in the control unit, and when executed, the computer program is configured for implementing the imaging method according to claim 1; the magnetic resonance scanner is configured for acquiring data of the first undersampled image frame and the second undersampled image frame.

* * * * *